United States Patent
Barclay et al.

(10) Patent No.: US 7,082,193 B2
(45) Date of Patent: Jul. 25, 2006

(54) CALL WAITING CALLING PARTY DEFINED CONTENT

(75) Inventors: Deborah Lewandowski Barclay, Winfield, IL (US); David S. Benco, Winfield, IL (US); Sanjeev Mahajan, Naperville, IL (US); Thomas Lee McRoberts, Naperville, IL (US); Raymond Leory Ruggerio, Glenview, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 107 days.

(21) Appl. No.: 10/761,577

(22) Filed: Jan. 21, 2004

(65) Prior Publication Data

US 2005/0157864 A1 Jul. 21, 2005

(51) Int. Cl.
*H04M 3/42* (2006.01)

(52) U.S. Cl. ............... 379/215.01; 379/68; 379/88.26; 379/211.01; 379/211.02

(58) Field of Classification Search ............. 379/88.19, 379/88.2, 88.21, 201.02, 201.03, 207.15, 379/215.01, 68, 88.26, 211.01, 211.02
See application file for complete search history.

(56) References Cited

U.S. PATENT DOCUMENTS

| | | | | |
|---|---|---|---|---|
| 5,467,388 A | * | 11/1995 | Redd et al. | ............ 379/210.02 |
| 5,511,111 A | * | 4/1996 | Serbetcioglu et al. | ..... 379/88.01 |
| 5,894,504 A | * | 4/1999 | Alfred et al. | ............. 379/88.13 |
| 5,999,613 A | * | 12/1999 | Nabkel et al. | ......... 379/215.01 |
| 6,005,870 A | * | 12/1999 | Leung et al. | ................ 370/466 |
| 6,026,156 A | * | 2/2000 | Epler et al. | ............ 379/215.01 |
| 6,160,877 A | * | 12/2000 | Tatchell et al. | ............. 379/197 |
| 6,343,121 B1 | * | 1/2002 | Infosino | ................ 379/215.01 |
| 6,353,660 B1 | * | 3/2002 | Burger et al. | ............. 379/88.17 |
| 6,498,841 B1 | * | 12/2002 | Bull et al. | ............. 379/142.08 |
| 6,724,872 B1 | * | 4/2004 | Moore et al. | ............ 379/93.35 |

* cited by examiner

Primary Examiner—Bing Q. Bui

(57) ABSTRACT

Embodiments of the method and system provide for providing a call waiting method for use in a telecommunications network in which a first caller is engaged in a current call with a second caller, and for processing an incoming call from a third caller to the first caller. The method may have the steps of: providing identification of a plurality of callers in a predefined caller group; detecting an incoming call from a third caller to a first caller, the first caller presently being engaged in a current call with a second caller; checking if the third caller is a member of the predefined caller group; if the third caller is a member of the predefined caller group, signaling the third caller to leave a message to be sent to the first caller with a call waiting indication, recording a message from the third caller, and providing to the first caller a call waiting indication along with the recorder message from the third caller; and, if the third caller is not a member of the predefined caller group, providing to the first caller only a call waiting indication. The system implements the method.

20 Claims, 7 Drawing Sheets

CALL WAITING CALLING PARTY DEFINED CONTENT

TECHNICAL FIELD

The present invention relates to telephony in general, and, more particularly, to a method and system that allows selected calling parties to record a brief voice message that will be used in addition to the normal call waiting tone.

BACKGROUND OF THE INVENTION

Telephone companies have provided, for a number of years, a call waiting service to which their customers may subscribe. If a customer subscribes to the call waiting service, then when the customer is on the telephone talking with a first party and a second party telephones the customer during the course of the conversation with the first party, the customer will hear a beep in the earpiece of the telephone to alert them to the fact that another call is waiting. The customer can then transmit a flash hook to the telephone company's central office, placing the conversation with the first party on hold and connecting the customer with the second party, allowing the customer to then enter into a conversation with the second party. However, the customer has no way of knowing who the second party is when they hear the beep in the earpiece and they have no idea whether or not the call from the second party is sufficiently urgent to warrant interrupting the conversation with the first party.

Newer methods for call delivery to a customer are, for example, the Integrated Services Digital Network (ISDN) that may have digital signaling channels for notification of an attempt, on the part of the network, to deliver a call to a customer. With ISDN, a customer can be notified of the attempt to deliver the call even though the customer may be engaged in a telephone call or connection with another party. Such notification can be made at the customer's telephone station or at a separate terminal. Additionally, the customer can also receive information related to the second call, such as Calling Line IDentification (CLID). This information may be displayed on the customer's station. Given this information, which is the telephone number of the calling party, the customer may elect to put the call in progress on hold and to connect with the new call. However, ISDN does not allow the calling party to identify the urgency of their call or to provide the user with a notification initiated by and defined by the calling party. Furthermore, the customer has no control over what parties are allowed to utilize the customer's call waiting feature.

Thus, it is a drawback of the prior art that there does not exist a database of preferred calling numbers that is provisioned by the subscriber. It is a further drawback of the prior art that the calling party cannot record a short message that may be used in addition to the normal call waiting tone.

SUMMARY

The following summary of embodiments of the invention is provided to facilitate an understanding of some of the innovative features unique to the present invention and is not intended to be a full description. A full appreciation of the various aspects of the invention can be gained by taking the entire specification, claims, drawings, and abstract as a whole.

In general terms, an embodiment of the present method is a call waiting method for use in a telecommunications network in which a first caller is engaged in a current call with a second caller, and for processing an incoming call from a third caller to the first caller. The method may have the steps of: providing identification of a plurality of callers in a predefined caller group; detecting an incoming call from a third caller to a first caller, the first caller presently being engaged in a current call with a second caller; checking if the third caller is a member of the predefined caller group; if the third caller is a member of the predefined caller group, signaling the third caller to leave a message to be sent to the first caller with a call waiting indication, recording a message from the third caller, and providing to the first caller a call waiting indication along with the recorder message from the third caller; and, if the third caller is not a member of the predefined caller group, providing to the first caller only a call waiting indication.

Also, in general terms, an embodiment of the present system is a call waiting system for use in a telecommunications network in which a first caller is engaged in a current call with a second caller, and wherein an incoming call from a third caller is received for the first caller. The system may have the following components: a caller group having at least one caller selected by the first caller; a subscriber database in the telecommunication network in which is stored identifications of the selected callers in the caller group; a recognition module operatively connected to the subscriber database, wherein upon detecting an incoming call from a third caller to a first caller, the first caller presently being engaged in a current call with a second caller, the recognition module comparing an identity of the third caller to the stored identifications of the selected callers in the subscriber database in the telecommunication network to determine if the third caller is a member of the caller group, and the recognition module having an output for outputting a message signal indicative of a result of the comparison; a message interface module operatively connected to the recognition module, the interface module having an input for receiving the signal, the interface module having an output for providing a signaling to the third caller that requests the third caller to leave a message when the message signal indicates that the third caller is a member of the predefined caller group; a recording module operatively connected to the message interface module, the recording module recording the message from the third caller; and a message database operatively connected to the message interface module, the recorded message being stored in the message database; wherein the recorded message from the third caller is provided to the first caller after a call waiting indication is provided to the first caller.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate an embodiment of the present invention and are not intended to limit the scope of the invention.

When a subscriber is active on a call and another call is inbound the traditional call waiting features generates a call waiting tone along with the callers identification. Embodiments of the present method and system provide the capability for selected calling parties to record a short announcement message that will be used instead of the call waiting tone. When the call is placed the calling parties number may be checked against the preferred list. If it is on the list and the called party is currently busy on a call, the calling party will be prompted, via a specialized tone or announcement, to record a short voice message that will be used in addition to the call waiting tone.

One advantage of the present method and system occurs when wireless subscribers use their phones while in an automobile or in transit. The convenience of having a short audio message relayed to them instead of a tone eliminates the need to pull the phone away from their face and look at the caller ID. This removes a distraction when the subscriber is driving a vehicle, for example. It also may eliminate the need to retrieve a voice mail message if the short announcement contains enough information that a message is not required.

A further benefit to the subscriber is that the subscriber is able to judge if the incoming call is important enough to place the current call on hold. Also, obtaining information by the announcement will be less of an interruption to the current call than current call waiting methods.

Figure 1:
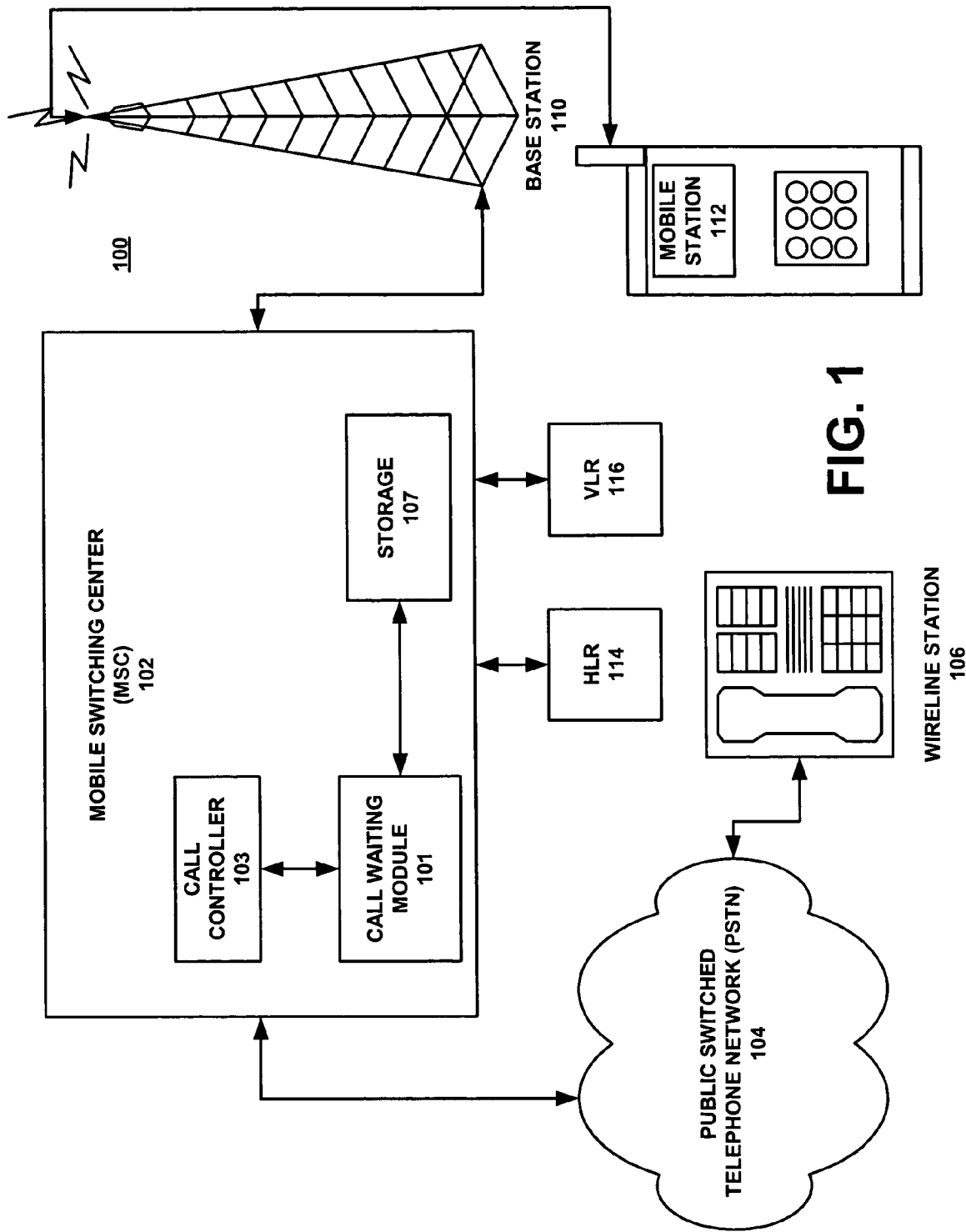
FIG. 1 depicts a block diagram illustrative of a mobile switching center, base station and mobile terminal for use with the present method and system.

The present method and system may be used with wireless, as well as, wired telecommunication networks. Referring to FIG. 1, one example of a telecommunication network 100 is depicted. At least one mobile terminal 112 of a plurality of mobile terminals may be operatively connected to the telecommunication network 100. Although the present system and method may be used with any type of network (wired and wireless, for example), the subscriber may typically be a mobile subscriber who uses a mobile terminal (also referred to as mobile phone, a cell phone, mobile handset, or car phone).

As depicted in the FIG. 1 embodiment, the network (or telecommunication network) 100 may have a mobile switching center (MSC) 102. The network 100 may be, or may be part of, one or more of a telephone network, a local area network ("LAN"), the Internet, and a wireless network. In the depicted embodiment, a public switched telephone network (PSTN) 104 is connected to the MSC 102. The PSTN 104 routes calls to and from mobile users through the MSC 102. The PSTN 104 also routes calls from and to wireline stations 106. The MSC 102 may also be connected to one or more base stations (BS) 110. Each of the base stations 110 communicates with mobile terminal(s) 112 in its service area. The PSTN 104 generally may be implemented as the worldwide voice telephone network accessible to all those with telephones and access privileges (e.g., AT&T long distance network).

Each of the mobile terminals 112 may have a home location register (HLR) 114 where data about each of the mobile terminals 112 resides. Some of the mobile terminals 112 may be remotely located from their home location, and in that case, a visiting location register (VLR) 116 is set up locally for each mobile terminal 112 that is visiting in its service area. HLR 114 can be implemented as a permanent SS7 database utilized in cellular networks, such as, but not limited to, for example, AMPS (Advanced Mobile Phone System), GSM (Global System for Mobile Communications), and PCS.

HLR 114 may be utilized generally to identify/verify a subscriber, and also contains subscriber data related to features and services. HLR 114 is generally utilized not only when a call is being made within a coverage area supported by a cellular provider of record, but also to verify the legitimacy and to support subscriber features when a subscriber is away from his or her home area. VLR 116, on the other hand, may be implemented as a local database maintained by the cellular provider whose territory is being roamed. Mobile terminal 112 may be implemented as a cellular device, personal communication device, short message service device or wireless communications device (e.g., a wireless personal digital assistant).

The MCS 102 may have, or be operatively connected to, components of a system for providing a call waiting feature. Such components in some embodiments may include: call waiting module 101, call controller 103 and storage 107 (such as a subscriber database) in the MCS 102.

Figure 2:
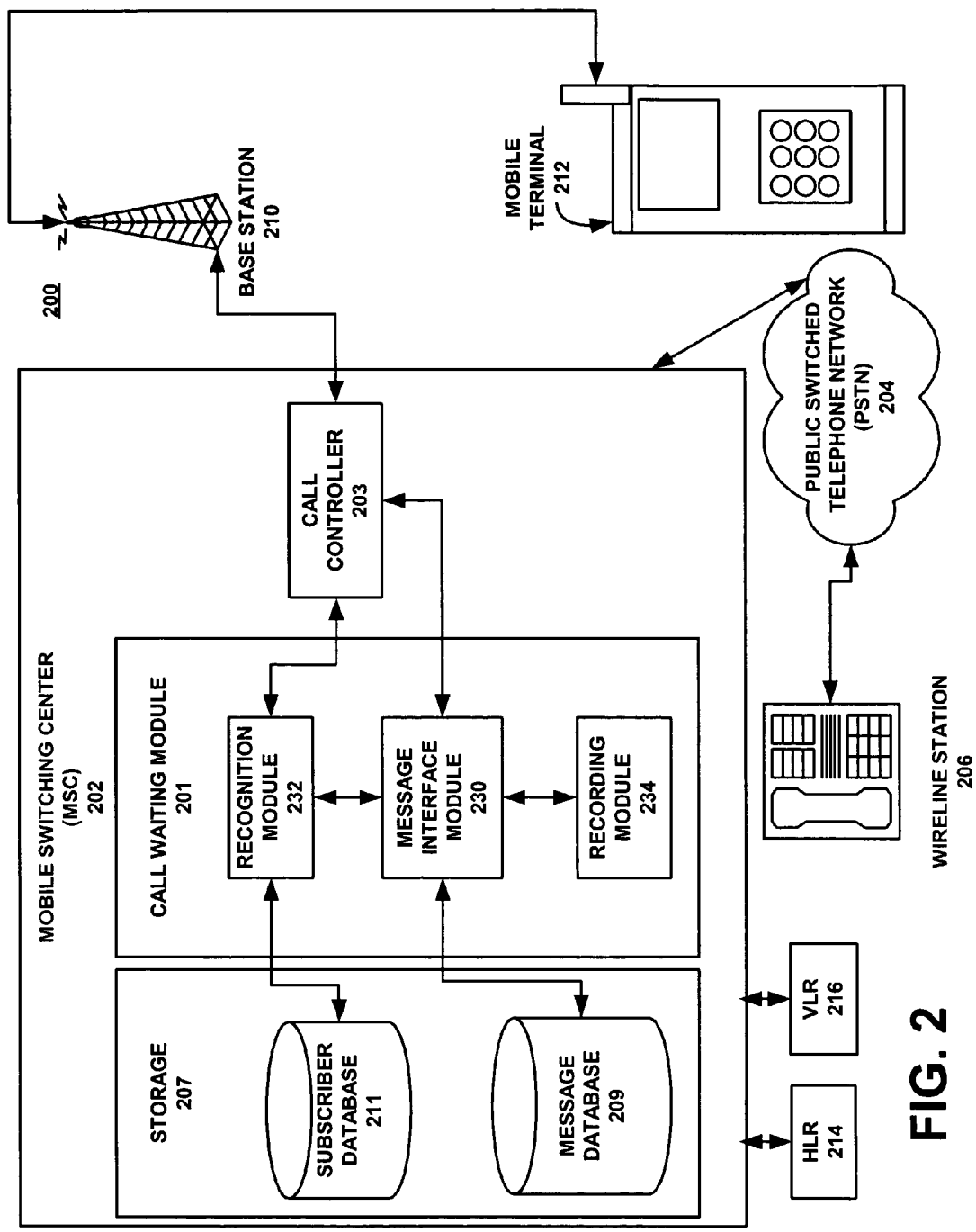
FIG. 2 illustrates a more detailed block diagram illustrative of a mobile switching center, base station, and mobile terminal according to one embodiment of the present method and system.

Referring to FIG. 2, a network (or telecommunication network) 200 is shown for at least one mobile terminal 212 of a plurality of mobile terminals operatively connected to the telecommunication network 200, which has a mobile switching center 202. FIG. 2 is a block diagram that is illustrative of a mobile switching center 202 operatively connected to PSTN 204, base station 210, and mobile terminal 212 according to one embodiment of the present method and system. The PSTN 204 routes calls to and from mobile terminal(s) 212 through the MSC 202, and also routes calls from and to wireline stations 206. The MSC 202 is connected to one or more base stations 210. The base station(s) 210 communicates through the air to mobile terminals 212, which, for example, may be of a cellular telephone type or of the wider bandwidth personal communication device type. Mobile terminals 212, for example, may be wireless handsets or automobile mounted stations the same as those shown in FIG. 1. The MSC 202 has operatively connected thereto a VLR 216 and a HLR 214 that interface with the mobile terminal 212 as explained above.

In general terms the present system may have the following components: a caller group having at least one caller selected by the first caller; a subscriber database 211 in the telecommunication network 200 in which is stored identifications of the selected callers in the caller group; a recognition module 232 operatively connected to the subscriber database 211, wherein upon detecting an incoming call from a third caller to a first caller, the first caller presently being engaged in a current call with a second caller, the recognition module 232 comparing an identity of the third caller to the stored identifications of the selected callers in the subscriber database 211 in the telecommunication network 200 to determine if the third caller is a member of the caller group, and the recognition module 232 having an output for outputting a message signal indicative of a result of the comparison; a message interface module 230 operatively connected to the recognition module 232, the interface module 230 having an input for receiving the signal, the interface module 230 having an output for providing a signaling to the third caller that requests the third caller to leave a message when the message signal indicates that the third caller is a member of the predefined caller group; a recording module 234 operatively connected to the message interface module 230, the recording module 234 recording the message from the third caller; and a message database 209 operatively connected to the message interface module 230, the recorded message being stored in the message database 209; wherein the recorded message from the third caller is provided to the first caller after a call waiting indication is provided to the first caller.

The subscriber database 211 and message database 209 may be separate storage elements, or may be portions of a common storage 207. The call waiting indication may be at least one of a predetermined tone (or combination of tones), an image, and a caller identification (such as, the phone number of the third caller. In an alternative embodiment the recorded message may be used instead of the predetermined tone. The recorded message may be temporarily stored in the message database 207 in the telecommunications network 200. Also, the recorded message may be replayed by the first caller, and/or saved by the first caller.

The messages may be exchanged between the telecommunication network 200 and the mobile terminal 212 via at least one of email, SMS, and data for display on the display 217 of the mobile terminal 212. Embodiments of the messages and the format for sending the messages may take many different forms in various embodiments of the present method and system.

Figure 3:
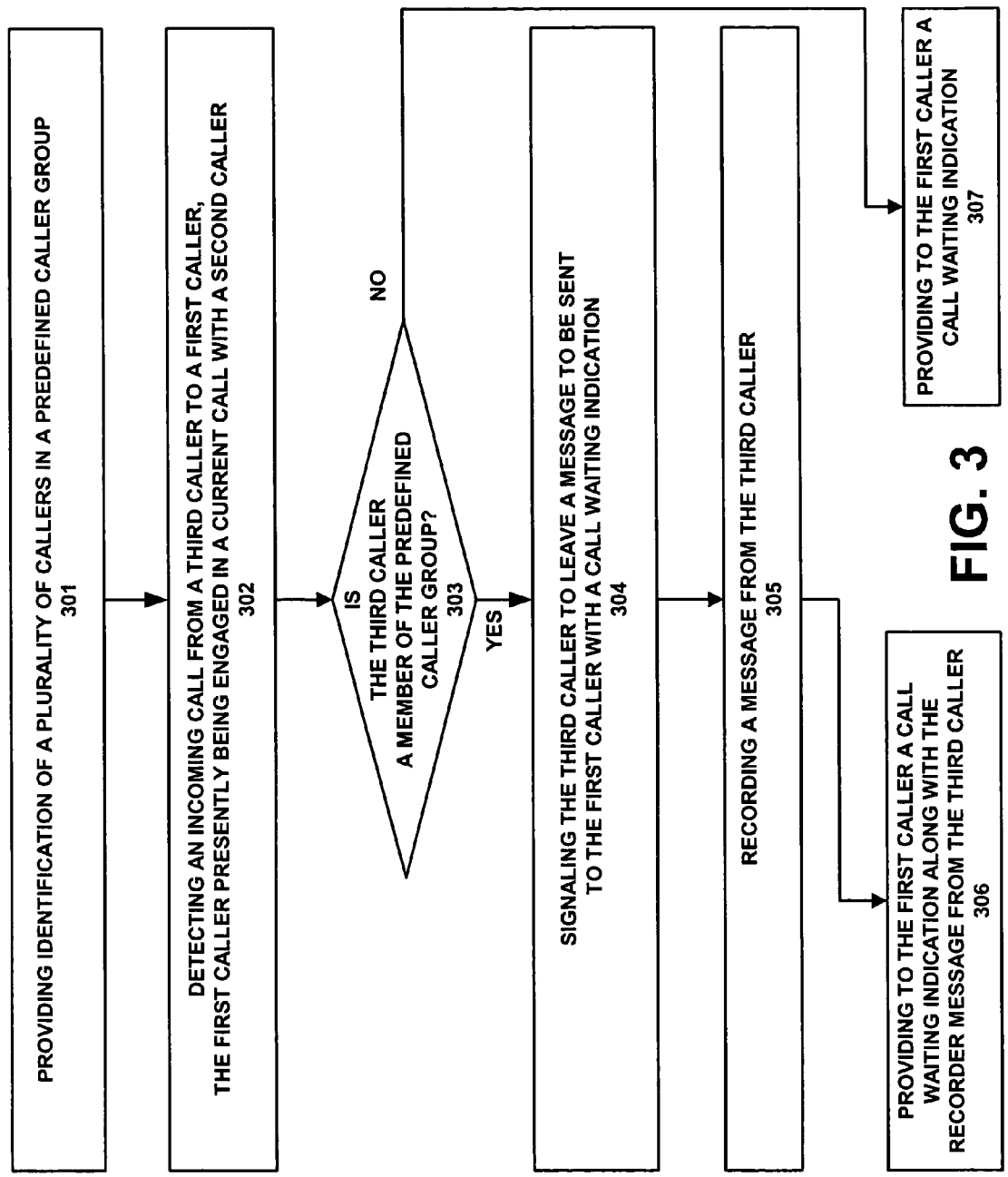
FIG. 3 illustrates a very general flow chart of logical operational steps that may be followed in accordance with one embodiment of the present method and system.

FIG. 3 is a general block diagram depicting an embodiment of the present method. In very general terms, the method may have the steps of: providing identification of a plurality of callers in a predefined caller group (step 301); detecting an incoming call from a third caller to a first caller, the first caller presently being engaged in a current call with a second caller (step 302); checking if the third caller is a member of the predefined caller group (step 303); if the third caller is a member of the predefined caller group, signaling the third caller to leave a message to be sent to the first caller with a call waiting indication (step 304), recording a message from the third caller (step 305), and providing to the first caller a call waiting indication along with the recorder message from the third caller (step 306); and, if the third caller is not a member of the predefined caller group, providing to the first caller only a call waiting indication (step 307).

Figure 4:
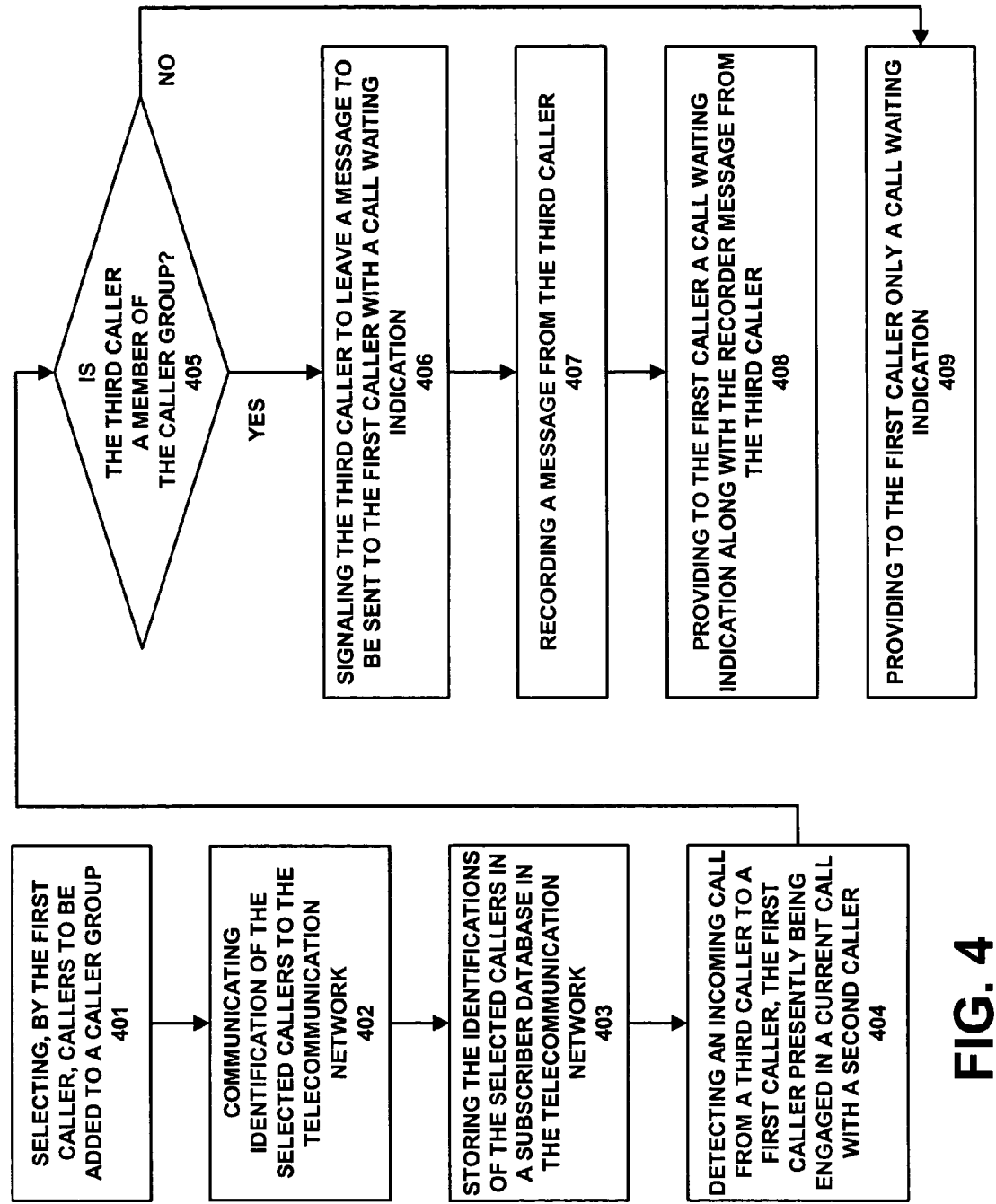
FIG. 4 illustrates another flow chart of logical operational steps that may be followed in accordance with one embodiment of the present method and system.

FIG. 4 is a block diagram depicting another embodiment of the present method. This embodiment of the method may have the steps of: selecting, by the first caller, callers to be added to a caller group (401); communicating identification of the selected callers to the telecommunication network (402); storing the identifications of the selected callers in a subscriber database in the telecommunication network (403); detecting an incoming call from a third caller to a first caller, the first caller presently being engaged in a current call with a second caller (404); comparing an identity of the third caller to the stored identifications of the selected callers in the subscriber database in the telecommunication network to determine if the third caller is a member of the caller group; providing a message signal indicative of a result of the comparison (405); if the message signal indicates that the third caller is a member of the predefined caller group, signaling the third caller to leave a message to be sent to the first caller with a call waiting indication (406), recording a message from the third caller (407), and providing to the first caller a call waiting indication along with the recorder message from the third caller (408); and, if the signal indicates that the third caller is not a member of the predefined caller group, providing to the first caller only a call waiting indication (409).

Figure 5:
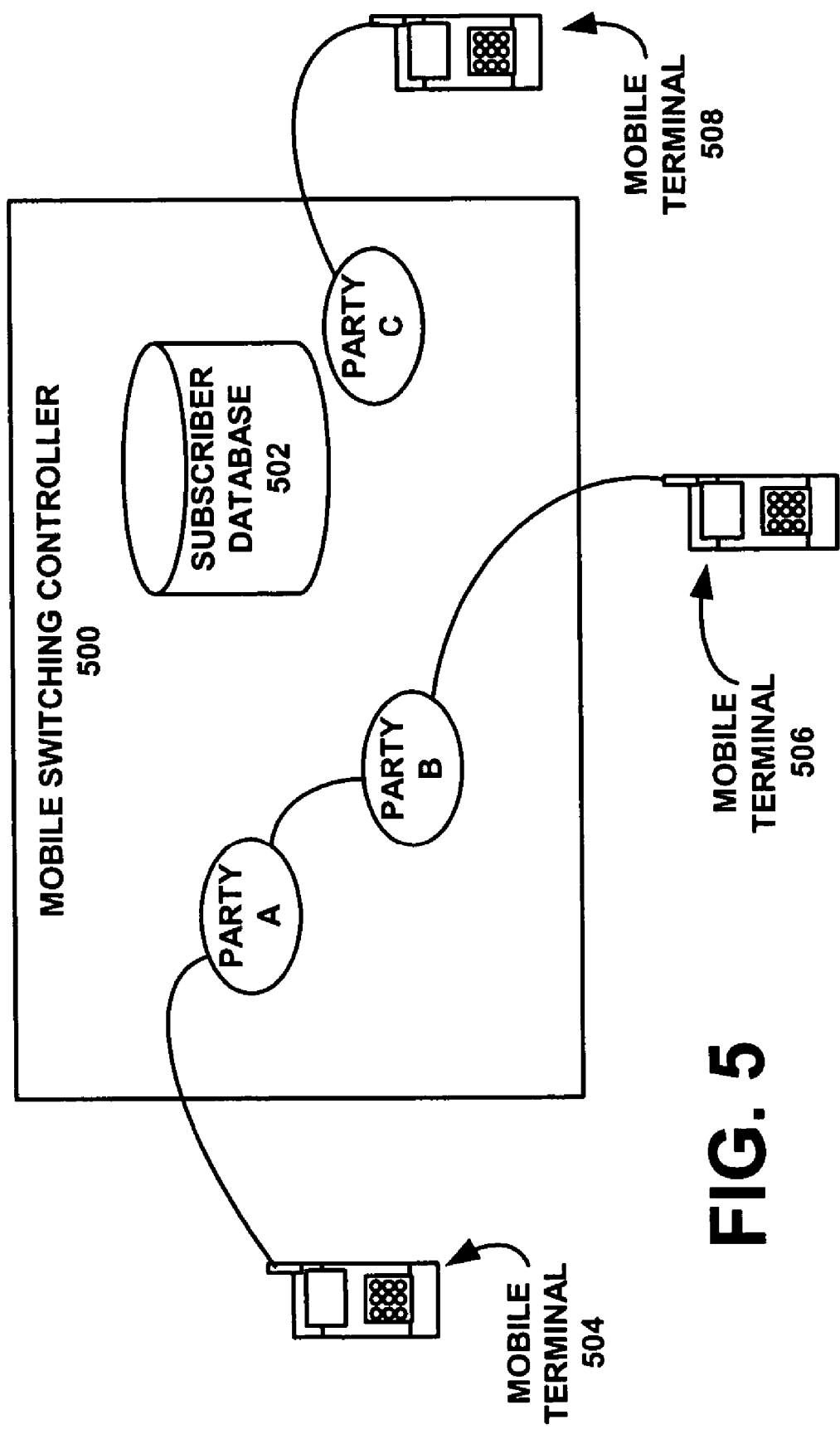
FIGS. 5–7 depict one example of the operation of an embodiment of the present method and system.
Figure 6:
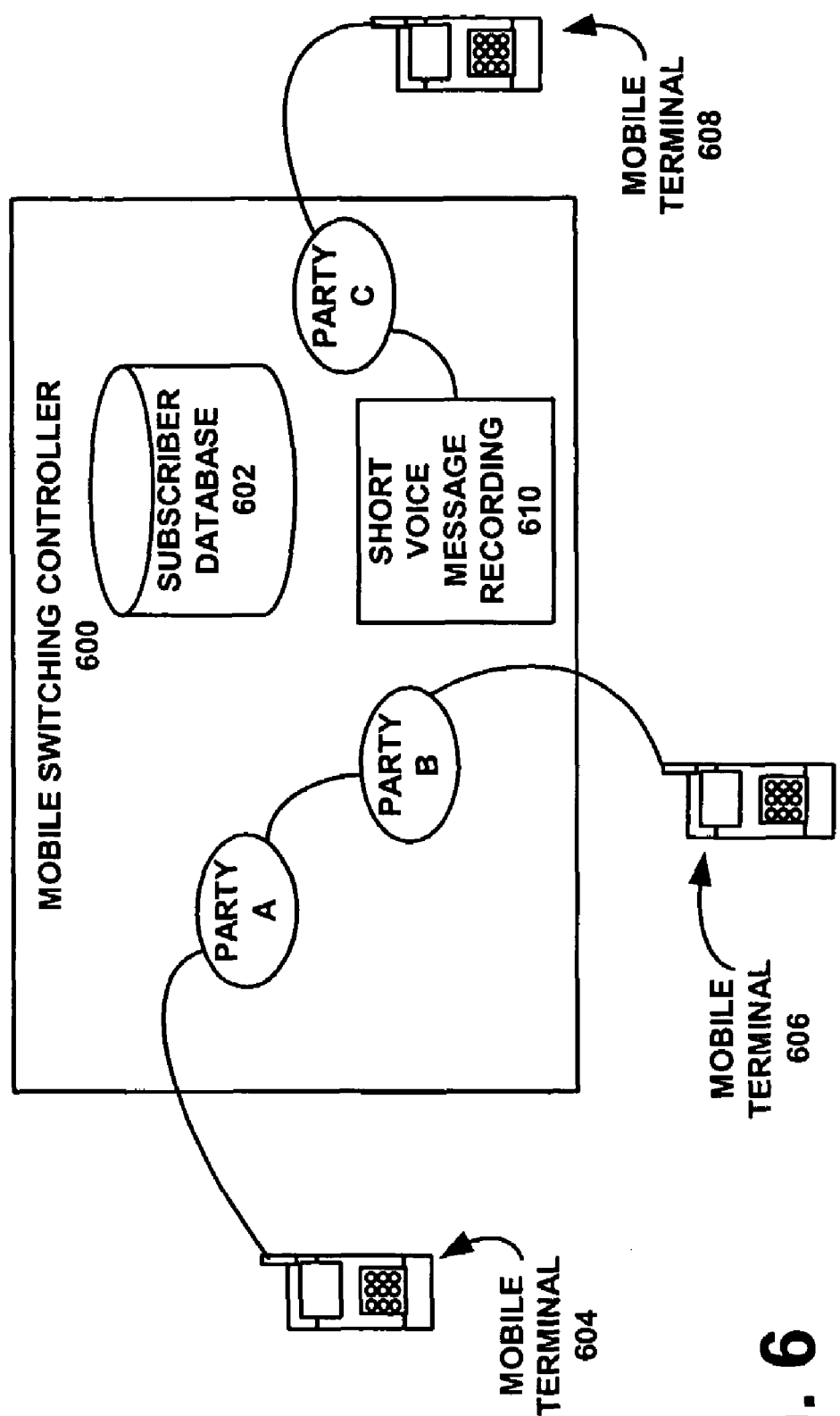
Figure 7:
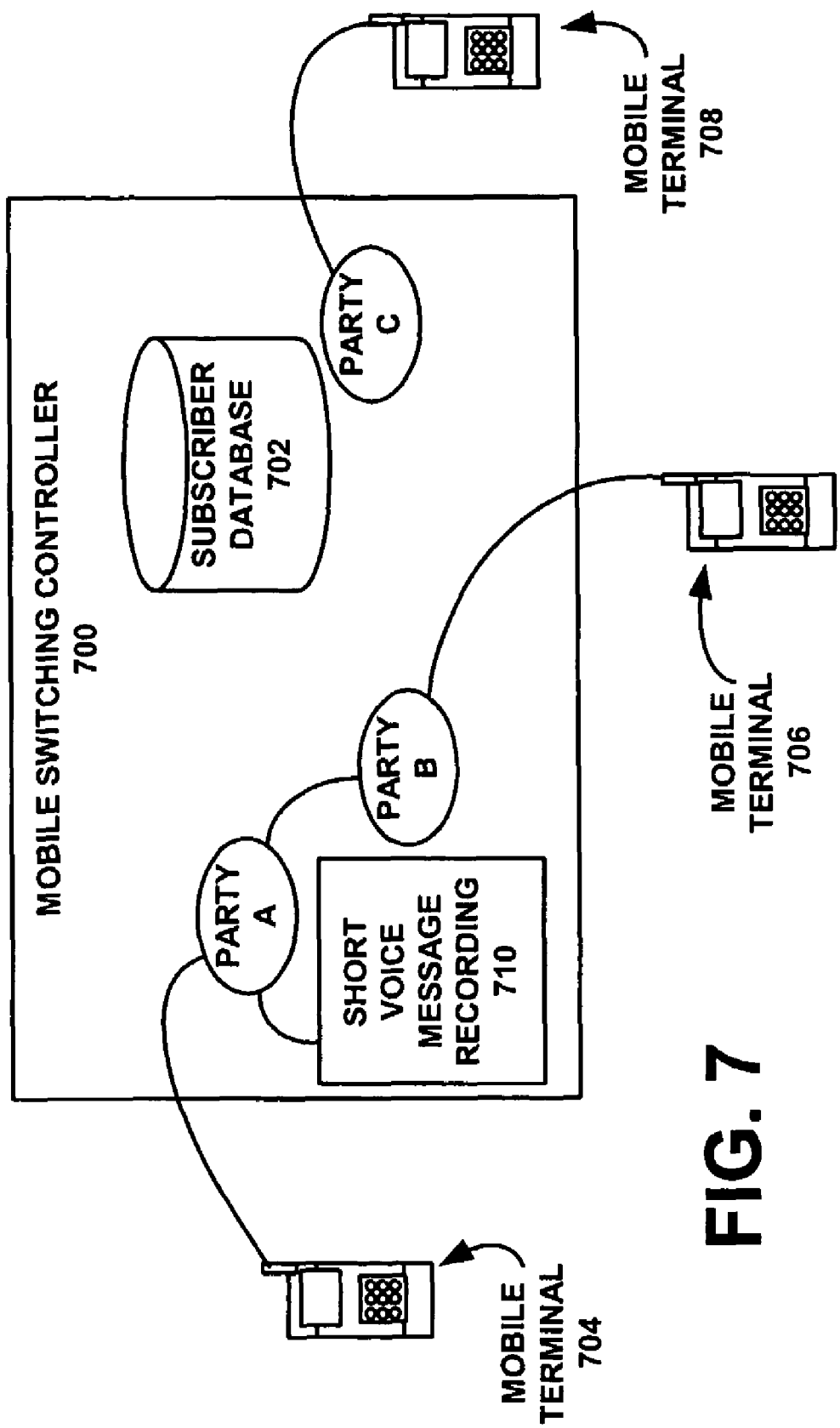

FIGS. 5–7 depict one example of the operation of an embodiment of the present method and system. As depicted in FIG. 5, party A has a mobile terminal 504, party B has a mobile terminal 506, and party C has a mobile terminal 508. FIG. 5 shows the MSC 500 having a subscriber database 502. FIG. 5 also shows an established call between party A and party B. Party A has provisioned a list of preferred calling numbers that are allowed to activate the Call Waiting Calling Party Defined Content feature prior to the incoming call. When party C calls party A, the MSC 500 checks to see if the called party has this feature and checks the database 502 in the MSC 500 for the preferred numbers for party A. If party C is on the preferred list, and party A is busy with a call, the feature is activated.

As depicted in FIG. 6, party A has a mobile terminal 604, party B has a mobile terminal 606, and party C has a mobile terminal 608. FIG. 6 shows the MSC 600 having a subscriber database 602 and a short voice message recording 610. FIG. 6 also shows how the MSC 600 captures the calling party's (party C) call waiting content. The MSC 600 signals to party C to leave a short message that will be used in the Call Waiting alert. Party C leaves a short message that is captured to a short voice message recording system 710. The duration of the message may be any length and may be provisioned by the service provider of the service.

As depicted in FIG. 7, party A has a mobile terminal 704, party B has a mobile terminal 706, and party C has a mobile terminal 708. FIG. 7 shows the MSC 700 having a subscriber database 702 and a short voice message recording 710. The MSC 700 delivers the calling party defined content. The MSC 700 first opens the voice path between Party B and Party A. The MSC 700 then inserts the short voice message content following the call waiting tone. Party A hears the short message while party B is played comfort noise/ music for that duration. Party A can perform any action that normally would be allowed after a call waiting tone is delivered. Party A can put party B on hold and connect with party C, or party A can ignore the call. Alternatively, if Party A wants to hear the short message again, this can be accomplished by Party A entering a function code while still connected with party B. Alternatively, if Party A wants to retrieve the message after the party A–party B call completes, it can enter a function code and the announcement will be stored in Party A's voice mail service.

Therefore, the improved present method and system overcomes the drawbacks of the prior art and provides a database of preferred calling numbers that is provisioned by the subscriber. The improved present method and system further provides that the calling party can record a short message that may be used in addition to or instead of the normal call waiting tone. Such is not found in the prior art.

The present system and method may be used with non-mobile phones, as well as, mobile phones. Also, different types of data storage devices may be used with the present method and system. For example, a data storage device may be one or more of a magnetic, electrical, optical, biological, and atomic data storage medium.

The method and system of the present invention may be implemented in hardware, software, or combinations of hardware and software. In a software embodiment, portions of the present invention may be computer program products embedded in computer readable medium. Portions of the system may employ and/or comprise a set and/or series of computer instructions written in or implemented with any of a number of programming languages, as will be appreciated by those skilled in the art.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

We claim:

1. A call waiting method for use in a telecommunications network in which a first caller is engaged in a current call with a second caller, and for processing an incoming call from a third caller to the first caller, the method comprising the steps of:
   providing identification of a plurality of callers in a predefined caller group;
   detecting an incoming call from a third caller to a first caller, the first caller presently being engaged in a current call with a second caller;
   checking if the third caller is a member of the predefined caller group;
   if the third caller is a member of the predefined caller group:
      signaling the third caller to leave a message to be sent to the first caller with a call waiting indication;
      recording a message from the third caller;
      providing to the first caller a call waiting indication along with the recorder message from the third caller; and
   if the third caller is not a member of the predefined caller group:
      providing to the first caller only a call waiting indication.

2. The method according to claim 1, wherein the call waiting indication is at least one of a predetermined tone, an image, and a caller identification.

3. The method according to claim 1, wherein the step of providing identification of a plurality of callers in a predefined caller group comprises the steps of:
   selecting, by the first caller, callers to be added to the caller group;
   communicating identification of the selected callers the telecommunication network; and
   storing the identifications of the selected callers in a storage in the telecommunication network.

4. The method according to claim 3, wherein the step of checking if the third caller is a member of the predefined caller group comprises the steps of:

comparing an identity of the third caller to the stored identifications of the selected callers in the storage in the telecommunication network to determine if the third caller is a member of the caller group; and
providing a message signal indicative of a result of the comparison.

5. The method according to claim 1, wherein the identifications of the selected callers are stored at least in a subscriber database in the telecommunications network.

6. The method according to claim 1, wherein the recorded message is temporarily stored in a message database in the telecommunications network.

7. The method according to claim 1, wherein the recorded message is replayable by the first caller.

8. The method according to claim 1, wherein the recorded message is saveable by the first caller.

9. The method according to claim 1, wherein the method further comprises converting the recorded message to text for imaging on a display of a terminal of the first caller.

10. The method according to claim 1, wherein the recorded message is temporarily stored in a message database in the telecommunications network.

11. The method according to claim 1, wherein the recorded message is replayable by the first caller.

12. The method according to claim 1, wherein the recorded message is saveable by the first caller.

13. The method according to claim 1, wherein the method further comprises converting the recorded message to text for imaging on a display of a terminal of the first caller.

14. A call waiting method for use in a telecommunications network in which a first caller is engaged in a current call with a second caller, and for processing an incoming call from a third caller to the first caller, the method comprising the steps of:
   selecting, by the first caller, callers to be added to a caller group;
   communicating identification of the selected callers to the telecommunication network;
   storing the identifications of the selected callers in a subscriber database in the telecommunication network;
   detecting an incoming call from a third caller to a first caller, the first caller presently being engaged in a current call with a second caller;
   comparing an identity of the third caller to the stored identifications of the selected callers in the subscriber database in the telecommunication network to determine if the third caller is a member of the caller group;
   providing a message signal indicative of a result of the comparison;
   if the message signal indicates that the third caller is a member of the predefined caller group:
      signaling the third caller to leave a message to be sent to the first caller with a call waiting indication;
      recording a message from the third caller;
      providing to the first caller a call waiting indication along with the recorder message from the third caller; and
   if the signal indicates that the third caller is not a member of the predefined caller group:
      providing to the first caller only a call waiting indication.

15. The method according to claim 14, wherein the call waiting indication is least one of a predetermined tone, an image, and a caller identification.

16. A call waiting system for use in a telecommunications network in which a first caller is engaged in a current call with a second caller, and wherein an incoming call from a third caller is received for the first caller, the system comprises:
- a caller group having at least one caller selected by the first caller;
- a subscriber database in the telecommunication network in which is stored identifications of the selected callers in the caller group;
- a recognition module operatively connected to the subscriber database, wherein upon detecting an incoming call from a third caller to a first caller, the first caller presently being engaged in a current call with a second caller, the recognition module comparing an identity of the third caller to the stored identifications of the selected callers in the subscriber database in the telecommunication network to determine if the third caller is a member of the caller group, and the recognition module having an output for outputting a message signal indicative of a result of the comparison;
- a message interface module operatively connected to the recognition module, the interface module having an input for receiving the signal, the interface module having an output for providing a signaling to the third caller that requests the third caller to leave a message when the message signal indicates that the third caller is a member of the predefined caller group;
- a recording module operatively connected to the message interface module, the recording module recording the message from the third caller; and
- a message database operatively connected to the message interface module, the recorded message being stored in the message database;
- wherein the recorded message from the third caller is provided to the first caller as a call waiting indication is provided to the first caller.

17. The system according to claim 16, wherein the call waiting indication is at least one of a predetermined tone, an image, and a caller identification.

18. The system according to claim 16, wherein the recorded message is temporarily stored in the message database in the telecommunications network.

19. The system according to claim 16, wherein the recorded message is replayable by the first caller.

20. The system according to claim 16, wherein the recorded message is saveable by the first caller.

* * * * *